Patented Apr. 22, 1924.

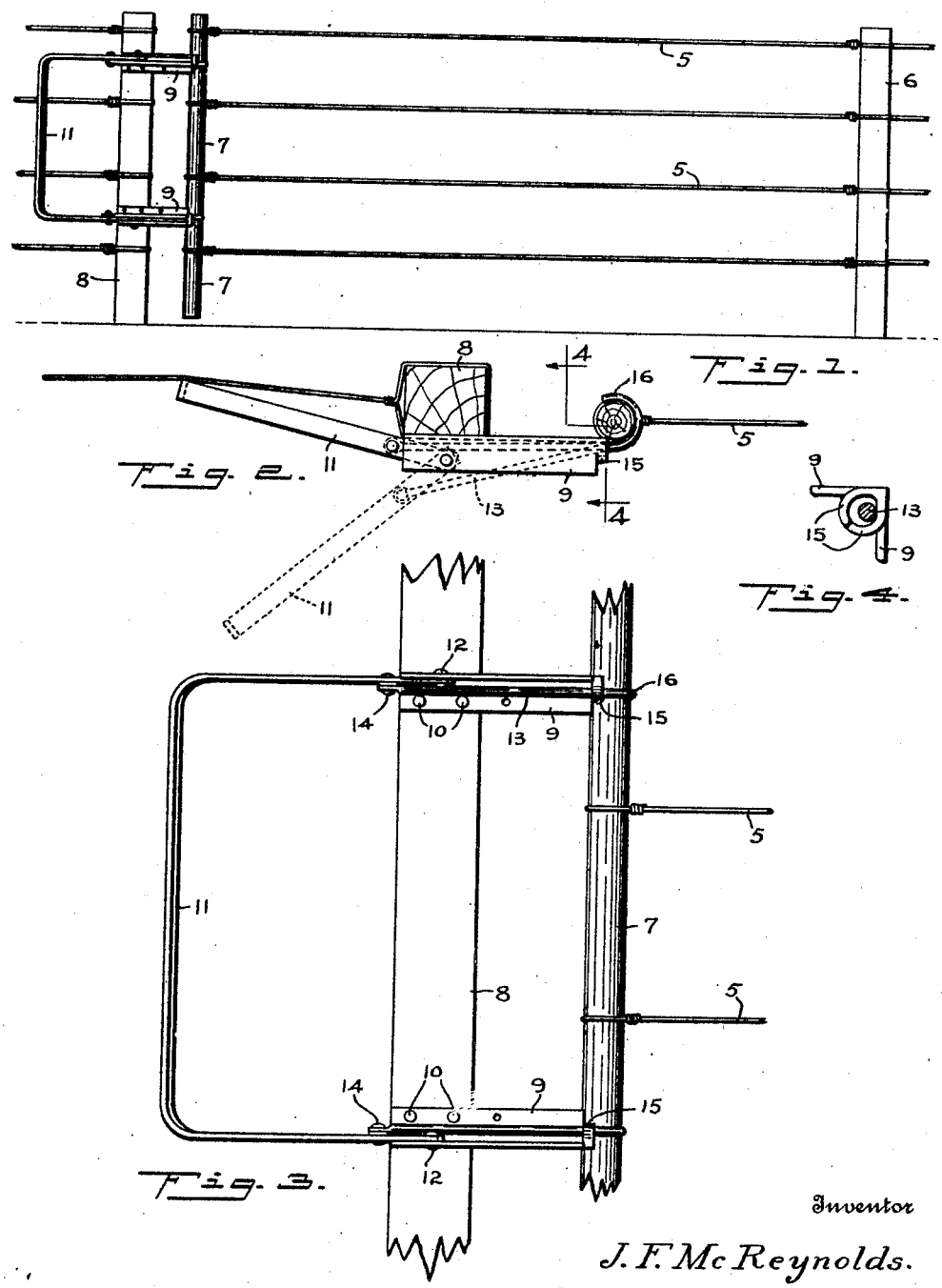

1,491,270

UNITED STATES PATENT OFFICE.

JAMES F. McREYNOLDS, OF LA PLATTE, NEBRASKA, ASSIGNOR, BY MESNE ASSIGNMENTS, TO CHARLES W. PEARSALL, OF OMAHA, NEBRASKA.

GATE FASTENER.

Application filed June 11, 1921. Serial No. 476,931.

*To all whom it may concern:*

Be it known that I, JAMES F. McREYNOLDS, a citizen of the United States, and a resident of La Platte, in the county of Sarpy and State of Nebraska, have invented certain new and useful Improvements in Gate Fasteners, of which the following is a specification.

My invention relates to gate fasteners, and particularly to fasteners adapted for use with frameless wire gates, such as are commonly used for farm fences. It is the object of my invention to provide for gates of this class a simple, strong, durable, inexpensive and easily operated fastening means, adapted to hold the gate under tension and to securely connect to the gate-post the stile or swinging bar at the end of the gate. A further object of my invention is to provide a fastener of this class, which, while readily operable both in fastening and releasing the gate, is not liable to be opened accidentally by animals or live stock.

In the accompanying drawings Fig. 1 is a side view of a gate provided with fastening means embodying my invention, Fig. 2 is a plan view of the fastener, Fig. 3 is a detail side view of the same, and Fig. 4 is a detail vertical section on the line 4—4 of Fig. 2, showing one of the fastener-brackets in end elevation.

Referring to the illustrated structure, it will be understood that the main portion of the gate consists merely of a series of horizontally extending wires 5 attached at one end to a post 6 which forms a terminus of the fence structure, the opposite ends of the wires 5 being connected with a swinging stile or bar 7 which is preferably of rounded or cylindrical form. The wires 5 are of such length that when they are properly stretched the stile 7 will adjoin the gate-post 8 sufficiently close to prevent the passage between them of ainmals which the fence structure is intended to restrain. The gate-post forms, of course, the terminus of the fence structure at the opposite end of the gate from the post 6.

The fastener is preferably made of metal throughout, and is carried upon the post 8, to which the brackets or frame-pieces 9 are fixedly secured by suitable means such as strong nails, or lag-screws 10. Said members 9 are formed by short pieces of angle-iron, having the flanges thereof suitably punched to form openings for receiving the fastening members 10 and the rivets by which the handle-lever 11 is connected therewith. The handle-lever is formed from a flat bar which is bent to an approximate U-shape, and the ends thereof are pivotally connected with the brackets 9, preferably by means of shouldered rivets 12, whereby to form a permanent but freely movable connection between the parts. Adjacent to the pivoted ends of the handle-lever the rods 13 are pivotally connected therewith preferably by means of rivets 14 similar to the rivets 12 connecting the handle-lever and the brackets 9. Said rods 13 extend adjacent to the horizontal flanges of the members 9 and pass loosely through guide-loops formed at the ends of said members by pairs of tongues 15 which are cut from the flanges of said members and curled toward each other as shown in Fig. 4. The ends of the rods 13 are bent to form semicircular hooks 16 adapted to engage the stile or gate-bar 7 as shown in Fig. 2.

After the assembly of the parts of the fastener, the handle-lever serves to connect and hold in properly spaced relation the pairs of frame-members 9 and the respective hook-rods, so that the installation of the fastener merely requires the nailing or bolting to the post 8 of the members 9, so that the latter are in a horizontal position and project from the post toward the gate-opening. By swinging the vertical portion of the handle-lever around toward the gate-opening the hooks 16 are moved outwardly from the post 8 far enough to enable the gate-bar or stile 7 to be readily engaged with the hooks, while the wires 5 remain loose or unstretched. By then swinging the handle-lever back to the position shown by dotted lines in Fig. 2 the stile 7 is pulled toward the post 8 and the wires 5 are drawn taut. From said position a slight additional force serves to move the handle-lever to the closed or locking position shown by full lines in said Fig. 2, and in moving to the latter position the lever passes an intermediate position or dead-center at which the rods 15 and the horizontal portions of the lever are in alinement. It will be seen that when the fastener is in the locked position the tension of the gate-wires tends to hold the handle-lever in said position, with the vertical portion thereof pressed against the fence-wires extending from the post 8, whereby there will be very little probability of the lever being engaged by animals and so moved as to release the fastener. It will be noted further, by reference to Fig. 3, that in passing the dead-center position the rods 15 move across the adjacent heads of the rivets 12 by which the handle-lever is pivoted to the frame-members 9, and the parts are so proportioned that a slight interference will occur between said rods and rivet-heads, necessitating a yielding or springing of the parts to enable them to pass. The resistance offered, by the interference of the rods and rivet-heads, to the movement over the dead-center, provides an additional safeguard to prevent accidental releasing of the fastener.

Owing to the great leverage provided in the device, particularly as the handle-lever approaches the dead-center position, the gate-wires may be placed under a sufficient tension to cause them to be straight and firm when the fastener is in the closed position, so that the gate will have the same strength and sightly appearance as any other portion of a well-constructed wire fence, while providing the user with an efficient and inexpensive gate. Obviously, the small amount of material required, and the simple form of the parts employed in the fastener, enable the same to be constructed at a minimum cost.

Now, having described my invention, what I claim and desire to secure by Letters Patent is:

1. In a device of the class described, a U-shaped handle-lever, frame-pieces to which the ends of the handle-lever are pivotally connected, hook-rods pivotally connected with the handle-lever adjacent to the pivoted ends of said lever, and guide-loops on the ends of the frame-pieces, the hook-rods passing slidably through said guide-loops and being movable longitudinally horizontally by swinging the handle-lever about the axis of its pivotal connection with the frame-pieces.

2. A gate fastener of the class described comprising vertically spaced angle-iron frame-pieces secured to the gate post and extending laterally therefrom, guides formed at the ends of said frame-pieces by portions of the flanges thereof, a U-shaped member having the end portions thereof pivoted to the said frame-pieces and hook rods connected with the said member and extending loosely through said guides and capable of longitudinal and horizontal movement with relation thereto, said hook rods adapted for detachably engaging the end-bar of the gate and being movable to pull the same toward the gate post.

3. A gate fastener of the class described, comprising vertically spaced angle-iron frame-pieces secured to the gate-post and extending laterally therefrom, guides formed at the ends of said pieces by portions of the flanges thereof separated from the body of the frame-pieces and having the free ends thereof bent to form loops, a U-shaped member having the end-portions thereof pivoted to said frame-pieces, and hook-rods connected with said member and extending loosely through said guides, said hook-rods adapted for detachably engaging the end-bar of the gate and being movable to pull the same toward the gate-post.

4. A gate fastener of the class described comprising vertically spaced angle-iron frame-pieces secured to a gate post and projecting laterally therefrom, the said frame-pieces comprising horizontal and vertical flanges, a U-shaped handle secured to the horizontal flanges, hook rods pivoted to the handle and adapted to engage a fence stile, the hook rods lying within the confines of the horizontal flanges whereby the same are protected by the said flanges from accidental displacement, the movement of the handle acting to draw the fence stile into abutment with the ends of the laterally extending frame-pieces.

5. A gate fastener of the class described comprising vertically spaced angle-iron frame-pieces secured to a gate post, a U-shaped handle pivoted to the frame-pieces by means of rivets, hooked arms pivoted to the handle and adapted to engage a gate stile to pull the same toward the fence post, one head of each of said rivets lying slightly in the path of travel of the hook arms whereby the hook arms lie behind the same when in retracted position and accidental releasing movement thereof is prevented.

JAMES F. McREYNOLDS.